United States Patent [19]
Matheson

[11] Patent Number: 5,383,702
[45] Date of Patent: Jan. 24, 1995

[54] TRUCK'S ONE-MAN CONVERTIBLE CAMPER-TOP/SKIFF

[76] Inventor: Mark W. Matheson, 4584 Georgia St. #4, San Diego, Calif. 92116

[21] Appl. No.: 137,511

[22] Filed: Oct. 18, 1993

[51] Int. Cl.⁶ ............................................. B60P 3/367
[52] U.S. Cl. .................................. 296/157; 296/164; 114/344; 114/352
[58] Field of Search ............... 296/156, 157, 164, 165, 296/167, 35.3; 114/344, 352, 353

[56] References Cited

U.S. PATENT DOCUMENTS

| | | |
|---|---|---|
| 3,473,839 | 10/1969 | Elble . |
| 3,522,967 | 8/1970 | Platt . |
| 3,817,413 | 6/1974 | Ham .................. 410/77 X |
| 3,916,468 | 11/1975 | Tetreault . |
| 4,052,761 | 10/1977 | Rilling . |
| 4,231,610 | 11/1980 | Stoll .................. 296/167 |
| 4,236,474 | 12/1980 | Buirski .................. 296/157 |
| 4,420,181 | 12/1983 | Hallburg .................. 296/157 |
| 4,444,427 | 4/1984 | Martin .................. 296/43 |
| 4,522,145 | 6/1985 | Stone .................. 114/352 |

*Primary Examiner*—Dennis H. Pedder

[57] ABSTRACT

A universal weather-tight pickup-truck camper-top configuration facilitating easy detatchment by the driver alone; plus, provision of an optional rentable component facilitating rapid one-man deployment into a trolling-skiff. The skiff's structure is divided into bow/stern sections, the stern-section forming the primary outer portion of the camper-top, the bow-section being concealably nested in stow-position directly thereunder;—giving a clean appearance belying the uniquely advantageous dual-purpose functionality. The sections nest inverted upon special slide-rails atop a pickups' existing sidewall-gunnels, enabling manual telescopic translation of the respective bow-sections aftward, for lowering to the ground where mid-ship flanges are easily deployed into aligned position by a single operator. A special vertically sliding midship keywayed channeled guillotine seat member, intimately locks the interfacing hull-section flanges in water-tight position. A detachably hinged camper/hatch-panel facilitates the camper's aft accessibility, and doubles as a boat-windshield; and rugged polycarbonate windows in both bow/transom-panels facilitate rear-viewing during camper-top mode.

6 Claims, 2 Drawing Sheets

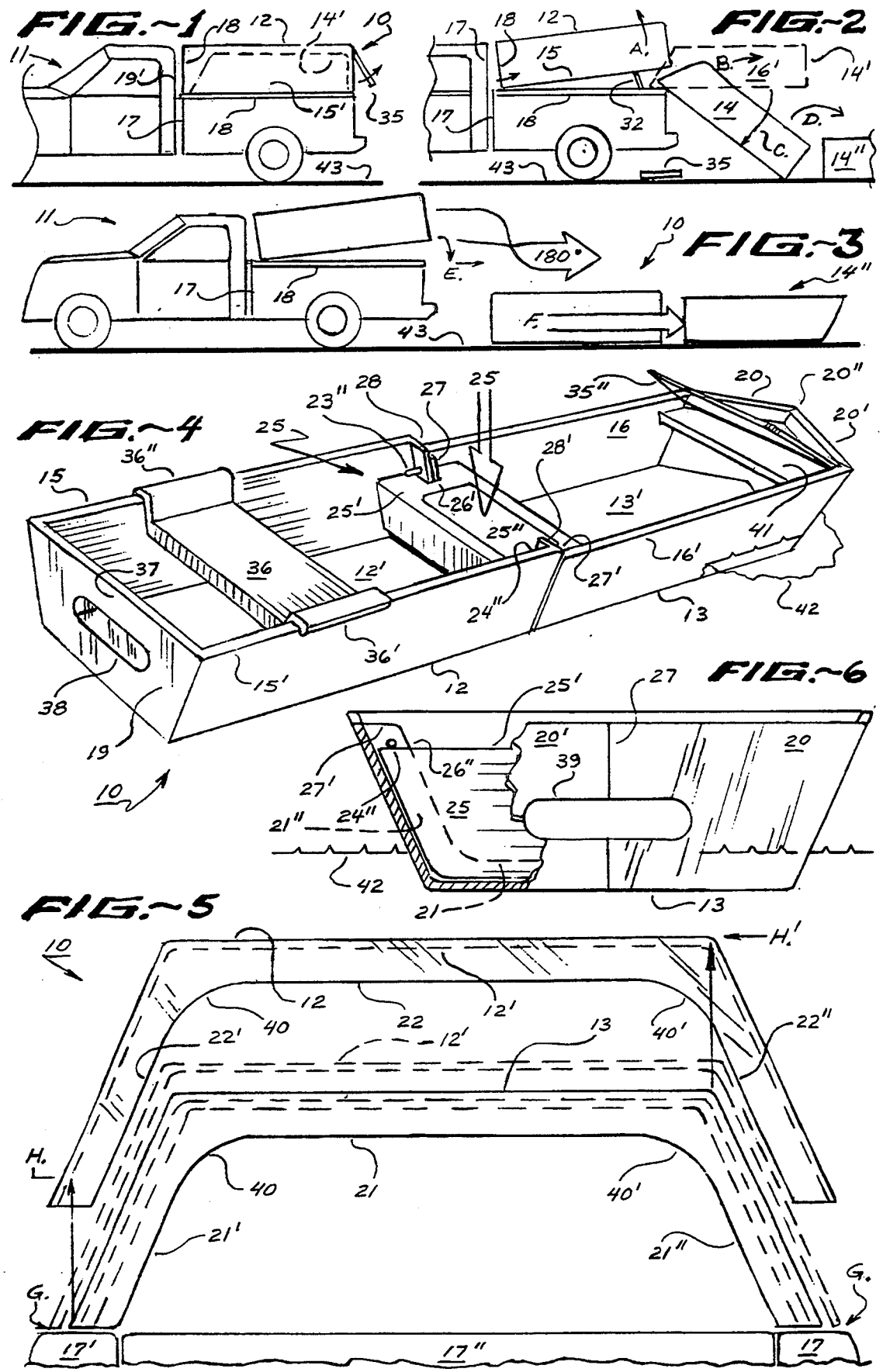

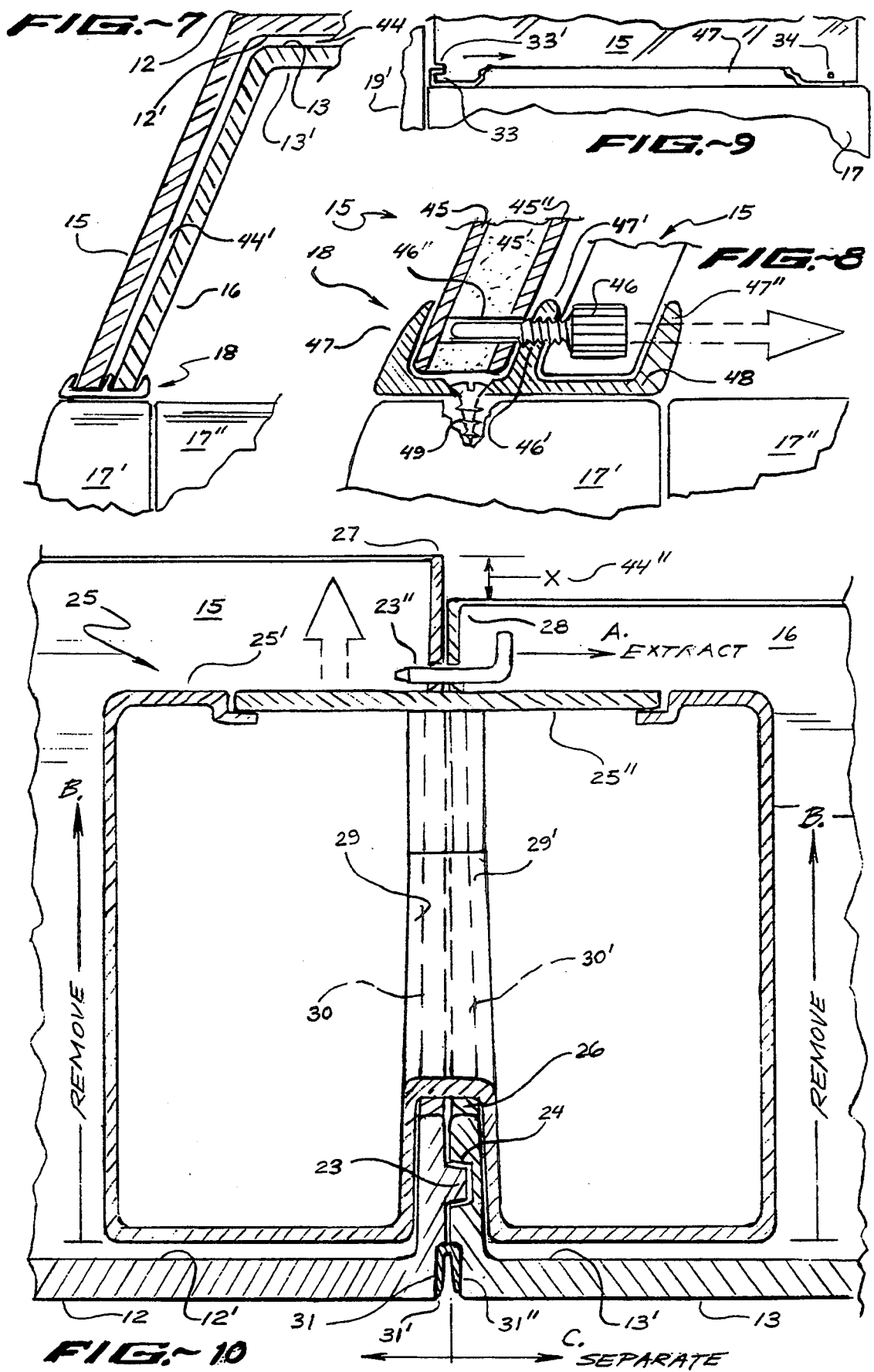

TRUCK'S ONE-MAN CONVERTIBLE CAMPER-TOP/SKIFF

I.) PROBLEMATICAL BACKGROUND OF RELEVANT EARLIER INVENTION

This invention relates to one-man removable camper-top configurations, dual-purpose skiffs, dual-prupose pickup-truck camper-tops; and more particularly, it relates to convenient one-man means of removing or reinstalling a pick-up truck's camper-top, and to those types of shell like hulls convertible into a more compact embodiment.

Heretofore, if one wished to detatch their pickup-truck's camper-top for functional use of the vehicle as a true pickup-truck to haul various large items, such as a stove or refrigerator, it has been considered a major chore; in as much as the shell is not only cumbersome and heavy, but the shell-structures are simply not really built with the impulsive notion in mind of quick and easy removal for an afternoon's access to the truck-bed. Additionally, there's also a need for a way to make use of the shell-structure as a portion of a sport-skiff type of recreational-boat.

Background research discovery provides some prior patent-art regarded as germane to this disclosure, for example U.S. Pat. No. 3,473,839 (filed: August 1967) teaches a "combined pick-up truck camper-body and houseboat", showing a rudimentary one-piece boat-hull inverted and positioned so that it's bow extends forward above the windshield of a 1967 style pick-up truck cab, while the stern portion extends well aftward of the truck's tailgate region. Below this arrangement are installed numerous separate planar panel-sections, some of which are windowed, making up a provisional pilot-house enclosure of the hull, once the entire assemblage were extricated from the vehicle and inverted right side up. Also provided is a planar panel which converts the windowed panel enclosure portion into a more conventional appearing camper-top, absent of the boat-hull portion; and in either embodiment, the installed assemblage is secured in place via four vertical turnbuckle devices at each corner of the rig. The structure does not appear to lend itself to one-man installation or removal.

In U.S. Pat. No. 3,522,967 (filed: March 1968) a "combination camper-top and houseboat" is shown, wherein again, the hull portion is inverted with the prow extending above the cab proximal to the windshield region. No explaination as to just how this fully assembled rig is manouvered as to install or remove it from the pick-up bed, even given a team of men; but in one mode of usage it's a houseboat floating on water, in the alternate mode of usage, it's shown installed inverted upon the truck as a happy-camber.

In U.S. Pat. No. 3,833,954 (September 1974) a "floatable telescoping transportable shelter" is tought, wherein three inter-nesting progressively smaller shell sections as shown to telescope out from retraction within the largest section,—until their perimeter flanges interlock to limit further extension therefrom. When once rendered fully retracted into a compact unitary appearing container, the nested assemblage is tipped 90-degrees over so that opposed wheels ride upon the ground, and a provisional hitch-structure is coupled to a separate conventional vehicle for drive away. Unfortunately, the stepped sections (when fully telescoped as a shelter) would not lend at all to a very efficient hull, owing to the hydrodynamic-drag imposed by the stepped configuration.

In U.S. Pat. No. 3,916,468 (filed: April 1974) a two or three section canoe-hull is tought, wherein each section is formed discretely as water-tight vessel portions, which are joined positively together via a dove-tailed tongue-and-groove arrangement at opposite lateral regions of the transverse abuting vertical-wall portions forming bulkhead like members. There is no contemplation as to spatially inter-nesting, or carrying upon a truck-bed.

In U.S. Pat. No. 3,933,112 (filed: November 1973) a camper-van appearing vehicle is festooned with boat-like appendages(attached prow, attached transom, etc.) purporting to convert a standard land-bus into an amphibious vehicle; including a separately removable roof-boat, again inverted to form a van-top portion.

In U.S. Pat. No. 4,052,761 (filed: October 1977) a "cartop trunk boat" is tought, wherein three discretely floatable hull-units are compactly nested into a forth inverted section, thereby forming an enclosed container during cartop transit to the water-side. To deploy as a skiff-boat, the stern is lifted away and upturned to the ground; where the remaining sections are somehow lifted-up out of the next one, and arranged in forward tapering portions having smoothly abutted surface transitions, so that the forth section forms the bow. Then, each section is interconnected via tongue & groove entities provided at the bottom of the hull surfaces (a peg & hole indexing method is employed at the transversely opposed hull-sides thereto) to the abutting water-tight transome-wall of the adjoining section, so that a substantially rigid aggregate assemblage is attained. If the individual hull-sections are made of light-weight fiberglass or vacuum-formed ABS-sheets, this could possibly constitute a one-man operation. However, the number of repetitive hull-section assembly steps involved, would be rather laborious; to the extent that one would probably seldom enjoy it's use.

In U.S. Pat. No. 4,220,370 (filed: November 1978) a pick-up truck-bed camper-top of rather conventional external appearance is shown, wherein is provided a second internally nested section also having four vertical walls; whereby vertical telescoping of the exterior section(having the roof portion), thus extends the height of the camper-top some 2½-feet, serving to give a more comfortable interior spaciousness.

In U.S. Pat. No. 4,236,474 (filed: October 1978) for a "convertible boat/canopy", is perhaps the most relevant of the prior patent-art, for it employs a quasi-catamaran style boat-hull aftward section in inverted attitude above right and left vertical side-panels, the panels of which rest upon the truck-bed's right and left side-walls. This arrangement disadvantageously positions the inverted-hull section considerably above the cab of the truck, resulting in a considerable amount of aerodynamic-drag. The patent's FIG. 16(exploded) shows how twin bow-sections are adapted into catamaran configuration; each section employing a vertically dove-tailed tongue-and-groove manner whereby the interior of the camper-modality is unfortunately taken-up by the storage therein of the two frontal-hull sections.

In U.S. Pat. No. 4,289,348 (filed: September 1979) is shown a "van-top conversion & boat combination", wherein a so-called bubble-top(vertically extended) van is provided with another like shaped outer shell portion, which is removable and inverted for use as a small boat.

In U.S. Pat. No. 4,420,181 (filed: June 1981) is shown an ordinary pick-up truck, wherein a small one-piece boat(having dual-hull appendages) is positioned bow-forward over the truck's bed. Included are dual-lateral fluid-cylinders, which either swing-up the aft end of the boat as a hatch, giving access to the truck-bed; or, the fluid-cylinders are also arranged on a longitudinal pivotal-axis, so that the operator may swing the entire boat aftward until the longitudinal-axis is perpendicular to the ground, where it may be detatched and lowered to the shore.

In U.S. Pat. No. 4,522,143 (filed: January 1983) is shown a cabin-boat with an over-folding stern-section, enabling the boat to be converted into a towable trailer combination.

In U.S. Pat. No. 4,789,196 (filed: September 1986) is shown an ordinary pick-up truck, wherein is provided an aftwardly extendible canvas accordian-pleated camper-top having variably spaced top-bow members sliding upon a longitudinal-extrusion bolted to the truck-bed gunwales; but no conversion to a boat modality is contemplated. Also, U.S. Pat. No. 4,789,197 (filed: June 1987) showed a like pick-up truck which bed portion is provided with a special inner-sliding(upon the truck-bed gunwales) retractable 3-section(2-slide) hard security-cover structure; but again which provides no conversion to a boat modality.

Finally, in U.S. Pat. No. 4,923,242 (filed: April 1988) is shown a pick-up truck-bed camper-top assembly having a special inverted-boat caping portion applied thereover, which is shaped in the form of a light-weight boat; whereby the stern aligns over the tail of the camper structure, while the bow aligns with the slope of the truck's windshield. Included are lateral tail-rollers on the cap, and struts joining the cap to the camper-top midship, act to guide the movement of the boat during both loading and unloading procedures.

Therefore, in view of the preceding patent-art, it is better understood that there is a need for a further improved product of this sort, which is the present subject of this instant invention to be known as the SHELL-FISH ™ -Combotop presently under auspices of the Matheson Mfg./Mkt. Co. of SanDiego, Calif.

II.) SUMMARY OF THE INVENTION:

A.) In view of the foregoing discussion about the earlier invention art, it is therefore important to make it pellucid to others interested in the art that one object of this invention is to provide a camper-top assembly for existing pick-up trucks which is at once light of weight and easy for a single person to install or remove, thereby making the truck's utility-bed more readily accessible for use in the various manner of chores for which it was designed. Conventional camper-top structures generally constructed of fiberglass or aluminum, while not necessarily excessive in weight, are nevertheless exceedingly difficult, if not impossible, for one person of average build to mount and demount upon the gunwales of a pick-up truck. The invention hereof preferably includes special laterally disposed longitudinal track-like slide-rail members which are secured to the truck-bed sidewalls and upon which are guided the camper-top gunwales, thereby serving to greatly assist the single operator in maneuvering the camper-top shell into place, as well as aiding it's subsequent ease of removal.

B.) Another important object of this invention according to preceding item-A, resides in it's optional adaptation by it's owner, to at any time in the future conversion of this single camper-top (also stern-shell) into a water-vessel, simply by purchasing an optional additional bow-section portion. This way, the entire internal confines of the camper-top modality is conventionally employed as fully usable space; while the perhaps only seasonally utilized and optional bow-section can be readily slid-in(concavity downward, bow forward) underneath the outer camper-top (temporarily tilted up at it's rear to allow passage of the inverted bow-section) upon the same track-like gunwale slide-rail members. A great commercial advantage of this 2-piece combination hull assembly concept, is that the pick-up truck owner need not ever actually purchase the second bow-section portion of the combination hull; but rather merely rent this perhaps only ocassionally needed portion (and it's associated interlocking keyway member), at a relatively modest rental sum. Although the internally nesting bow-section is actually quite efficient in it's space utilization, in this way, if the full camper-top cabin space is normally required, the owner need not be concerned with possible storage of the bow-section in one's garage for example, where it could take up needed space. And the rental/dealer finds the storage of several bow-sections quite space efficient, since the bow-sections can be compactly stack-nested together as well.

C.) Another important object of this invention is to provide a further feature of great utilitarian convenience, whereby the above mentioned camper-top structure is also readily adaptable as the stern-section of a two-section skiff like light-weight boat. In camper-top modality, this top-section is mounted inverted, so that the concavity of it's hull formation is facing downward; while in boat modality, the same concavity is necessarily upturned to form the rear-half of the boat-hull assembly. A second boat-hull bow-section is preferably removed initially, then inverted and rigidly attached midship to the stern-section which is preferably demounted from the truck last. To accomodate the preferred sequence of demounting of hull-sections from the truck-bed structure, the outer stern-section is first elevated sufficiently at its mounted rear region, as to enable a single person to easily slide the inwardly nested bow-section to be longitudinally extracted, by pulling the bow-section aftwardly along the lateral truck-bed sidewall longitudinal slide-rails, until it's aftward most portion can be let down to the ground. At this time, the thus extricated bow-section can be stood with it's bow portion pointing straight up from the ground, whereupon continued maneuvering of the bow portion aftwardly, enables the bow-section to be lowered to the ground concavity facing upward, into it's alternate skiff modality.

D.) Another object of this invention is to provide a combination of a camper-top invertible into a water-vessel's stern-section, and an optional internally stowed inverted bow-section, whereby the two sectional portions are demounted from the dual longitudinal slide-rails affixed to a pick-up truck-bed's sidewalls, and then joined mid-ship when resting upon the ground.

Proper alignment at the mid-ship region is achieved via special interfacing alignment-luggings, which are built-in to the essential transverse/hull-flanges formed at the open-ends of both the stern and bow hull-sections, and although possibly made in various embodiments, most preferably embody a longitudinally oriented male/female lug-and-hole arrangement, the male-lugs being of rugged design protruding from one of the vertical transverse/hull-flange portions, thereby readily inserting longitudinally into the mating female-hole entities formed into the like opposing vertical transverse/hull-flange portion of the adjoining hull-section.

Once thus aligned, absolute rigidity is uniquely attained at this critical mid-ship joint region via installation of a special transversely arranged so-called guillotine-seat member, which is manually slid vertically down over the transverse-flanges, locking the two halfs intimately in position in a water-tight manner(a rubber strip-seal is necesarily spaced between the mating flanges). In addition to the natural friction-fit of the galantine-seat about the inner-facing right/left hull-flanges, absolutely positive longitudinal locking-pins are also provided to block vertical release of the galantine-seat. The locking-pins must be extracted from longitudinally aligned pin-holes passing through the accessible vertically extending portions of said interfacing transverse/hull-flanges, —before the galantine-seat member can be vertically separated from the transverse/hull-flanges.

Although it is preferred that the two mating hull sections both be made independently unsinkable, such as is usually realized from a fiberglass laminate construction having a central planar-core of low-density urethane-foam,—thereby preventing any possibility of sinking; the mated hull halls would normally be attached/detatched only when resting upon the shoreline, where they can be more easily maneuvered into, or out of, mated position.

Additionally, it is desired that the guillotine-seat be formed with hollow confines. thereby facilitating it's also serving as a convenient stow-box (suitable for fishing-gear. rope, food-reserves, etc.), having an openable upper seat-hatch member enabling access therein. Also, when the combination camper-top/water-vessel aggregation are normally installed upon the truck-bed, is is preferred that the provisional transom portion of the camper-top house an integral high-strength window, and that the forward facing bow portion of the inwardly nested bow-section also house an integral high-strength window; the two longitudinally aligned windows thereby enabling viewing rearwardly therethrough, as well as further aftward through a suitable window formed into the rear-hatch member, thereby affording safe highway viewing aftwardly when the aggregate hull sections are installed upon the truck-bed.

III.) DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the claims section annexed hereto; and accordingly, a better understanding of the invention and the variant uses is intended, by reference to the drawings, which are considered as primarily exemplary and not to be therefore construed as restrictive in nature.

FIG. 1, is a left side elevation-view wherein the frontal portion is abbreviated for spatial considerations;

FIG. 2, is an aftwardly expanded view sequence thereof;

FIG. 3, is a further aftwardly expanded elevation-view sequence thereof;

FIG. 4, is a pictorial perspective-view, favoring the upper right stern aspect portion of invention;

FIG. 5, is a rear elevation-view of the camper-top modality, showing in partly phantom-outlined two-sequences how the top is elevated to a second position;

FIG. 6, is a partial cutaway frontal elevation-view, of the invention in it's water vessel modality;

FIG. 7, is a rear elevation-view (viewing longitudinally forward) showing a portion of the truck's rear left-corner, and a typical mid-length transverse cross-section of the complete camper-top portion installed thereupon;

FIG. 8, is a greatly enlarged detail view thereof, taken transversely through the retention-pin region;

FIG. 9, is a partial left/side-elevation view, including partial cut-away portions seen at the front and rear ends of the slide-rail member for greater clarity;

FIG. 10, is a greatly enlarged partial right/side-elevation cross-sectional view, revealing details of presently preferred construction along the longitudinal center-line.

IV.) ITEMIZED NOMENCLATURE REFERENCES

10—the overall camper-top
11—a typical pick-up truck
12.12'—camper-top roof surface, inside stern-section hull-floor
13,13'—bow-section hull-bottom, inside hull-floor
14,14',14"—inverted bow-section, nested bow-section, normal bow-section
15/15'—gunwales of stern-section, left/right
16'—gunwales of bow-section, left/right
17/17',17"—sidewall of truck-bed, left/right; truck-tailgate
18/18'—fixed slide-rails, left/right
19;19"stern-section transom-wall: truck-cab back-wall
20/20',20"—transverse-nose bow-section, left/right panels, prow
21/21'/21"—bow-section transverse-flange portions, mid/left-vertical/right-vertical
22/22'/22"—stern-section transverse-flange portions, mid/left-vertical/right-vertical
23/23'; 23"—male-peg alignment luggings, left/right; left locking-pin
24/24'; 24"—female-hole alignment luggings, left/right; right locking-pin
25,25',25"—overall guillotine-seat, seat-top, seat-hatch
26/26'/26"—transverse-channel keyway portions, mid/left/right
27/27'—bow-section transverse-flange crests, left/right
28/28'—stern-section transverse-flange crests, left/-right
29/29'—opposed channel-wall tapering surfaces
30/30'—opposed flange-wall tapering surfaces
31/31',31"—flange-seal mounting/free-flap, perimeter-recess
32/32'—camper-top support-struts, left/right
33/33'—slide-rail forward primary anti-lift flanges, left/right; safety engager-groove
34/34'—slide-rail aftward secondary anti-slide/anti-lift retention-pin holes, left/right
35/35'/35"—aft access-hatch, top-mounted/removed/-cowl-mounted
36,36'/36"—drop-on stern-seat, left/right gunwale-hangers 37—trolling-motor mounting surface
38—transom-window
39—bow-window
40—stress-relief radius, left/right
41—bow cowl-seat
42—water ref.-tine
43—shore/ground ref.-line
44/44',44"—upper nesting-gap/side nesting-gap, gunwale step
45/45'/45"—exterior-laminant/foam-core/interior-laminant
46/46'/46"—thumbscrew/screw-threads/retention-pin shank
47/47'/47"—outboard-flange/mid-flange/inboard-flange
48—flange-relief
49—mounting-screw

V.) DETAILED DESCRIPTION OF THE PREFERRED EMBODIMENTS

Initial reference is given by way of FIG. 1, wherein is exhibited a first illustration sequence of a three-sequence illustration showing how the invention may be demounted from the sidewalls 17 of a typical bed assembly of a conventional pick-up truck 11. Note here, that the longitudinally symmetrical camper-top section 10 includes a vertical transverse transom-wall 19, a contiguous longitudinal water-tight top-surface 12, and contiguous water-tight lateral sides which forms the gunwale base portion 15 which rest ostensibly upon longitudinal slide-rails 18 securely attached atop (preferably via spaced 5/16"-sheetmetal screws ) the conventional truck-bed sidewall 17(which are not standardized, and therefore run anywhere from 2"-5" in transverse width). Thus, it is seen how the truck-cab's back-wall surface 19' normally closely adjoins the camper-top wall 19(transom), whereby the overall-height of the truck-cab closely approximates that of the installed camper-top; thereby maintaining the essential drag-coefficient of the truck-cab alone. There remaining subtle, however critical further features which are to become more evident and understood as vital improvements, as the description continues.

Hence, we see that the camper-top is preferably full-width, full-height, and full-length, relative to the existing truck-cab 11,—giving the flush clean-lined appearance of a substantially conventional modern camper-top assembly; including a rear access-hatch 35, having a hinge-axis arranged at it's upper transverse corners, so that the planar hatch 35 may be pivoted conventionally outward as indicated via the attendant reference-arrow. This hatch panel 35 is preferably made of rugged ¼-inch(thickness) transparent(tint optional) polycarbonate-plastic, and as such can be readily detached via simple slide-pins (hinge-pins) at the already indicated hinge-point, whereby the removed hatch 35' may also serve as an effective windbreaker cowl-windshield 35"(FIG. 4), when employed in the water-vessel modality, —as shall be subsequently explained herein.

While the camper-top 10 may actually be purchased and employed solely in this single-shell camper-top modality alone, perhaps in some cases never as a combination apparatus convertible into a water-vessel; it's inner-confines preferably house an optional second portion 14 of very similar construction, which is preferably made relatively slight of vertical height therein as to facilitate intimate nesting requirements. A big advantage of this unique system of construction resides in the ability of the inner-nesting bow-shell portion to be simply rented from a dealer if only an occasional requirement for a skiff type boat is had by a particular buyer of the primary camper-top product.

Although both the inverted hull-sections 10 and 14 are resting upon the truck's sidewalls, it is preferred that special extruded-aluminum(or other suitable material) slide-rails 18 be permanently installed upon the truck's sidewalls 17/17', facilitating the great ease by which the respective half-section shells may be mounted/demounted thereupon. The following FIG. 2 sequence shows the preferred manner by which the internally nested shell 14' is extricated from within the resting camper-top 10. The camper-top 10 is first manually elevated a few inches (per example FIG. 5 also) according to reference arrow-A, whereupon two short laterally disposed support-struts 32 (which may be built-in to the slide-rails) serve to momentarily prop the camper-top gunwales up from slide-rails 18. Now the inwardly nested shell half 14' is pulled aftwardly per ref.arrow-B to position 14, whereupon the outermost portion of inner-shell 14 is lowered to the ground per ref.arrow-C; —the single operator continuing to rock the now ground stabilized shell further aftward per ref.arrow-D until the shell finally lands to rest upon shore-line 43 at position 14".

Next, according to most preferred procedure, the operator commences to drop the rear end of the camper-top shell 10 back down upon slid-rails 18, and likewise pull the outer shell 10 rearward until it's aftward most end can be lowered to the ground (making sure that preceding shell 14 had been pulled sufficiently away from the rear of the truck as to allow ample working space), where it is likewise further rocked over until coming to rest upon the ground with it's gunwales facing upward;—whereupon it is simply turned around 180-degrees until the respective transverse-flanges 21 and 22 are facing directly opposite each other.

At this stage, reference to FIGS. 4,6,10 shows the two interfacing flanges 21/22 are to be readily drawn together, by virtue of aligning aid provided by male(-pegs) 23/24 and female(holes) 23'/24' luggings, whereupon as is indicated in FIG. 4 (via large ref.-arrow), a special guillotine-seat device 25 is forced down over the intimately mating transverse-flanges, until the galantine-seat is fully settled-in. As result of this assembly procedure, the exemplified rubber perimeter flange-seal having a mounting-leg 31 and free-flap 31', impinges against the perimeter-recess surface 31",—which seals well against hydrostatic and dynamic pressures. Study of FIG. 6 clearly shows how the rigid transverse-channel molded into the galantine-seat is comprised of a mid-keyway portion 26 formed continuously with marginal right 26' and left 26" keyway portions, which are formed to include a slight approximate 2½-degree tapering-section walls 29/29' which being wider at the channels opening and narrowing towards it's uppermost depth, fits precisely with a similar opposed tapering-section walls 30/30' of the transverse-flanges, thereby making installation of the galantine-seat a quick and easy procedure, requiring little force, especially when a thin film of silicon or wax is seasonally applied to the seat-channel and engaging transverse-flanges. Although the transverse-channel 26 protrudes into the preferably hollow interior confines, the confines are generous enough that access via seat-hatch 25" finds ample storage space on each side of the protrusion.

Properly designed, it is preferred that a slight air-gap remain in space 26 as well as between the underside of the guillotine-seat and the adjoining deck floors 12'/13'; thereby assuring that the tapered channel and flange cross-sections clearly seen in FIG. 10, can act to squeeze the interfacing flanges 21/22 into ultimately rigid intimacy. Once this stage of assembly is achieved, dual lateral safety locking-pins 23"/24" are to be inserted into longitudinal-holes made into the crests 27/28 & 27'/28' of the respective transverse-flanges. Although a simple L-shaped locking-pin is shown here, various other types of equivalent type locking devices may be substituted as a matter of manufacturing design.

It should also be noted, that while the vertical or perpendicular formation of the transverse-flanges is preferred, the flanges can be designed so as to provide a canted rear backlight or transom, only requiring that the guillotine-seat be likewise provided with a likewise canted keyway channel 26. To disassemble the once assembled 15½-foot skiff exemplified in FIG. 4, reference to FIG. 10 shows a proper sequence, beginning with: A.) extraction of the safety pin 23"; B.) upward lifting of the entire galantine-seat unit 25; and, C.) longitudinal separation of the joined bow 14" and stern (camper-top) 10.

Reference to FIG. 7,8,9, reveals the manner in which the two slide-rails (mirror 41- bow cowl-seat images of each other) 18 and 18'(not actually shown) are preferably formed about 1-inch in height from the common base-plate portion, of extruded aluminum or plastic, with three inwardly canted vertical slide-flanges 47/47'/47". In FIG. 7 the outboard-rail portion 47 thus cooperates with the mid-rail portion 47', so as to provide longitudinal sliding guidance of the outward shell 10; while the inboard-rail 47" cooperates on the opposite side of the mid-rail 47' to provide sliding guidance to the internally nesting shell 15. The fit here should be loose, so as to obviate any binding occurrence during manual sliding of the respective shells. Ample air-space or practical nesting-gap 44 and 44' is considered to be about ¾-inch; and is further represented in dimension-X 44" of the assembled boat, which amounts to a step-up from the bow's gunwales 16/16' to the stern's gunwales 15/15'; which if eliminated, would require that the outboard portion 47(and immediate base-plate slide-groove) of the slide-rails 18 be made ¾-inch higher than the equivalent inboard surface portion 48.

Also notice in FIGS. 8,9, how once the camper-top 15 is pushed fully forward so that the special transverse anti-lift flange entity 33, automatically engages into the mating safety-groove entity 33', thereby checking any possibility of aerodynamic or other lifting occurrence here. This frontal retention arrangement is further maintained via provision of the retention-pin holes 34, which in FIG. 8 is seen to be achieved via provision of a simple transverse retention-pin 46" entering the hole 34 seen in FIG. 9. The quick screw-threads 46' act into the mid-rail 47', while the thumb-knob 46 thus also effectively blocks rearward sliding passage of the internally nesting shell 16. Notice also, how the rear most portion of the inboard slide-rail 47" is relieved forward sufficient distance as to enable easy finger-grip and clearance for insertion/extraction as is suggested in the accompanying motion arrow thereto. A plurality of suitable mounting-screws 49 serve to permanently affix the slide-rails 18 and 18' (not actually shown) to the truck-bed sidewalls. In both views FIGS. 7,8, the vitally important transverse-flanges have been cut-away, so as to more clearly reveal other features of the invention. Additionally, in FIG. 8, the cross-section of the shell member 15 serves to suggest the sort of reinforced-plastic construction which is rather preferred; since inclusion of the foam-core 45' center not only lends greatly improved rigidity to the structure,—it also makes the boat virtually sink-proof.

Thus, it is readily understood how the preferred and generic-variant embodiments of this invention contemplate performing functions in a novel way not heretofore available nor realized. It is implicit that the utility of the foregoing adaptations of this invention are not necessarily dependent upon any prevailing invention patent; and, while the present invention has been well described hereinbefore by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended claims set out the scope of the invention sought, and are to be construed as broadly as the terminology therein employed permits, reckoning that the invention verily comprehends every use of which it is suseptible. Accordingly, the embodiments of the invention in which an exclusive property or proprietary privilege is claimed, are defined as follows.

What is claimed of proprietary inventive origin is

1. A pick-up truck type camper-top assembly, wherein is provided improved convenience of handling, facilitating improved single-person attachment/detachment ease relative to the truck's utility-bed, including dual-purpose capability thereby said camper-top assembly can also function as a skiff like water-vessel; the combination: apparatus comprising:

a shell like structure formed of two longitudinal oriented substantially vertical planar side-walls joined contiguously in support of a planar roof portion and a contiguous planar vertical transverse frontal-wall stationed immediately aftward of the pick-up truck's existing cab portion; including two special longitudinal slide-rail members, one of which is installed atop each of the truck's two existing utility-bed sidewalls, said slide-rails each including upwardly extending inboard and outboard flanges of about one-inch height, thereby serving to positively guide the manual fore/aft sliding of the camper-top's sidewalls therein; the forward-end of both said slide-rails including an automatic self-engaging anti-lift means, intermeshing as the camper-top is being manually slid into final forwardmost installed position, so as to impinge with the lower portion of the transverse frontal-wall in such a manner preventing undesirable upward lifting and subsequent escapement of the camper-top therefrom, such as might otherwise be caused by a vandal or force of air-currents when the vehicle is moving forward at speed; and including anti-slide/anti-lift means situated at the aftward ends of both the slide-rails, engaged from within the camper-top confines so that upon closing of a planar transverse hatch-panel filling the aftward accessway, and conventional locking of same, the camper-top is ultimately rendered secure against unwarranted removal;

plus an additional modality of usage, whereby said camper-top once slidably removed form the slide-rails and inverted, so that the longitudinal side-walls and the transverse frontal-wall become the stern-section gunwales of the skiff embodiment; and whereby an essential second shell like component normally stowed nestedly out of sight within the confines of the camper-top while upon its sidewalls with its open-end facing aftward, is also slidable removed from the slide-rails and likewise inverted upon the shoreline to form an instant skiff bow-section, whereby both said sections are subsequently joined there so their open-end transverse-flanges matedly interface and become precisely positioned via laterally opposed integral alignment-luggings means included upon said transverse-flanges, whereupon a separate transverse vertically keywayed channel member interlocking means is lowered upon the mating transverse-flanges, thereby positively joining said mating transverse-flanges intimately into a rigidly united assembly capable of withstanding the rigors of hydrodynamic forces once launched into a waterway; subsequent converse disassembly as a skiff, and reinstallation upon the truck-bed slide-rails being likewise operable via a single person.

2. The combination camper-top/water-vessel according to claim 1, wherein an alignment-lugging means is a longitudinally oriented male/female lug-and-hole arrangement, the said male lugs being of rugged design protruding from one of the transverse-flange portions, so as to readily insert longitudinally into the mating female hole entities made into the opposing transverse-flange portion of the adjoining hull section.

3. The combination camper-top/water-vessel according to claim 1, wherein said vertically keywayed channel structure interlocking means, is made as a guillotine-seat structure which holds the transverse-flanges captive within both its contiguous vertical/side-channel and horizontal/bottom-channel portions.

4. The combination camper-top;/water-vessel according to claim 3, wherein said guillotine seat structure is formed with hollow confines so as to additionally serve as a convenient stow-box, having an openable upper seat-hatch member facilitating access therein.

5. The combination camper-top/water-vessel according to claim 3, wherein the guillotine-seat structure is further secured about the joined transverse-flanges of the stern and bow hull sections, via employment of longitudinal locking-pins which pass through longitudinally aligned pin-holes provided in the upper-end of vertically extending portions of the joined transverse-flanges; thereby preventing inadvertent upward release of said guillotine-seat until the release blocking locking-pins are both willfully and manually removed therefrom.

6. The combination camper-top/water-vessel according to claim 1, wherein said camper-top portion and the internally nested second shell component both include a provisional rear-view window facilitating rearward viewing by the truck's driver; whereas the frontal wall of the camper-top houses an integral high-strength window entity, and the forward facing bow portion of the second shell houses an integral high-strength window entity; the combined said windows thereby enabling viewing therethrough, and through a suitable window formed into the said rear-hatch member, thereby affording safe highway viewing aftwardly with the aggregate hull sections installed upon the truck-bed.

* * * * *